(12) United States Patent
Mustafin et al.

(10) Patent No.: US 10,937,556 B2
(45) Date of Patent: Mar. 2, 2021

(54) SEALED CABLE INLET THROUGH AN EXTERNAL AND AN INTERNAL WALL OF A CONTAINMENT SHELL OF A NUCLEAR POWER STATION

(71) Applicant: Joint Stock Company "Atomenergoproekt", Moscow (RU)

(72) Inventors: Marat Renadovich Mustafin, Dmitrov (RU); Aleksandr Grigoryevich Gerasimenko, Podosk (RU); Valentin Ivanovich Tsapalikov, Ramensky (RU); Nikolai Anatolyevich Ivanov, Moscow (RU); Gennady Alekseevich Novikov, Moscow (RU); Arnold Borisovich Tikhomirov, Moscow (RU); Ivan Mikhailovich Khaustov, Moscow (RU)

(73) Assignee: Joint Stock Company "Atomenergoproekt", Moscow (RU)

( * ) Notice: Subject to any disclaimer, the term of this patent is extended or adjusted under 35 U.S.C. 154(b) by 586 days.

(21) Appl. No.: 15/119,611

(22) PCT Filed: Feb. 17, 2015

(86) PCT No.: PCT/RU2015/000100
§ 371 (c)(1),
(2) Date: Aug. 17, 2016

(87) PCT Pub. No.: WO2015/130194
PCT Pub. Date: Sep. 3, 2015

(65) Prior Publication Data
US 2017/0062081 A1     Mar. 2, 2017

(30) Foreign Application Priority Data

Feb. 26, 2014   (RU) .......................... RU2014107111

(51) Int. Cl.
*G21C 13/036* (2006.01)
*G21C 13/04* (2006.01)
(Continued)

(52) U.S. Cl.
CPC ........... *G21C 13/036* (2013.01); *G21C 13/04* (2013.01); *G21C 17/116* (2013.01); *H02G 3/22* (2013.01); *Y02E 30/40* (2013.01)

(58) Field of Classification Search
CPC ........ G21C 13/02; G21C 13/04; G21C 13/36; G21C 17/116; G21C 13/028;
(Continued)

(56) References Cited

U.S. PATENT DOCUMENTS 2,014,355 A * 9/1935 Hussman ................ F16L 55/02
285/226
4,092,490 A * 5/1978 Schabert .............. G21C 13/036
376/292

(Continued)

FOREIGN PATENT DOCUMENTS

RU          1835106         8/1993

OTHER PUBLICATIONS

Machine Translation of Abstract of SU1835106.
(Continued)

*Primary Examiner* — Lily C Garner
(74) *Attorney, Agent, or Firm* — Preston Smirman; Smirman IP Law, PLLC

(57) ABSTRACT

The invention relates to the field of electrical engineering, and specifically to sealed inlets of electrical circuits into a sealed area of a multi-layered containment shell of a nuclear power station. This design can be used in passages through an external and an internal wall which are subject to relative mutual displacement as a consequence of a seismic phenomenon or thermal expansion of the walls and passage. The problem addressed by the present invention is that of increasing the operating reliability of a sealed cable inlet when high-voltage electrical conductors which have little bending capacity are used. The problem addressed is achieved in that the sealed cable inlet through an external and an internal wall of a containment shell of a nuclear power station comprises an embedded pipe (3) which is arranged in the internal wall (1), with an inlet section (44) of a cable (2) fixed rigidly within said pipe. A means for compensating for a relative movement between the cable (2) and the external wall (11) is mounted in the external wall (11) coaxially with respect to the pipe (3). The compensating means has a tube (19) with a bellows (24) on the external end plane (20) and with a second analogous bellows (25) which is mounted symmetrically on the opposite end plane (21) of the tube (19) at the internal surface (18) of the external wall
(Continued)

(11). The free ends (30) and (31) of the two bellows (24) and (25) are of conical design and have internal surfaces (28) and (29) which are support elements for an outlet section (46) of the cable (2), which is arranged freely in the tube (19) with a gap (47) relative to the internal surface (49) of the tube (19). The gap (47) between the braiding (48) along the external surface of the cable (2) and the internal surface (49) of the tube (19) is selected using a design calculation. The gap (47) must not be less than the value of maximum orthogonal thermo-seismic movement in one plane of the internal wall (1) relative to the external wall (11) and change in the coaxial position of the cable (2) in the tube (19).

5 Claims, 3 Drawing Sheets

(51) Int. Cl.
*H02G 3/22* (2006.01)
*G21C 17/116* (2006.01)

(58) Field of Classification Search
CPC .. G21C 13/032; G21C 13/036; G21C 13/038; G21C 13/06; G21C 13/10; G21C 13/067; G21C 13/0675; G21C 13/0936
See application file for complete search history.

(56) References Cited

U.S. PATENT DOCUMENTS

| | | | |
|---|---|---|---|
| 4,107,456 A * | 8/1978 | Schuster | G21C 17/116 174/11 R |
| 5,198,617 A | 3/1993 | Ozeki et al. | |
| 6,838,622 B2 * | 1/2005 | Zuch | H02G 3/22 174/100 |
| 7,547,059 B2 | 6/2009 | Delaine | |
| 2009/0032281 A1 * | 2/2009 | Turcovsky | E04G 15/061 174/83 |
| 2014/0147302 A1 * | 5/2014 | Howell | F04D 29/126 417/313 |

OTHER PUBLICATIONS

International Search Report dated Jun. 18, 2015.
Translation of International Search Report dated Jun. 18, 2015.
Written Opinion of International Searching Authority dated Jun. 18, 2015.
Translation of Written Opinion of International Searching Authority dated Jun. 18, 2015.
International Preliminary Report on Patentability dated Aug. 30, 2016.
Translation of International Preliminary Report on Patentability dated Aug. 30, 2016.

* cited by examiner

SEALED CABLE INLET THROUGH AN EXTERNAL AND AN INTERNAL WALL OF A CONTAINMENT SHELL OF A NUCLEAR POWER STATION

CROSS-REFERENCE TO RELATED APPLICATION

The instant application is a national phase of PCT International Application No. PCT/RU2015/000100, filed Feb. 17, 2015, and claims priority to Russian Patent Application Serial No. 2014107111, filed Feb. 26, 2014, the entire specifications of both of which are expressly incorporated herein by reference.

The invention relates to electrical engineering namely to sealed inputs of electric circuits into the confinement area of multi-layer nuclear power plant containment and can be used in penetrations through external and internal walls subjected to relative mutual displacement due to seismic events or thermal expansion of walls and penetrations.

Sealed electric input through a reinforced concrete wall of nuclear power plant containment containing a shell with biological protection system and electrical conductors is disclosed (see USSR Certificate of Authorship No. 1551142 of Apr. 14, 1988 MPK: H01B17/26).

This sealed input is designed only for electrical conductors entries in the nuclear power plant containment with one reinforced concrete wall. To improve safety level of nuclear power plant operations, multi-layer containments of at least of two walls came to use. Therefore, it became necessary to create sealed electric inputs that may be passed both through reinforced concrete external and internal walls near the gap.

The most appropriate technical solution to the above is a sealed cable input through external and internal walls of the nuclear power plant containment containing an embedded connection pipe installed inside the internal wall with internally and rigidly fixed cable input and a pipe installed inside the external wall in line with the connection pipe with bellows on the external end where cable output is located on supports with a gap relating to the pipe internal surface (see U.S. Pat. No. 4,107,456 C1. G21C13/02 published on Aug. 15, 1978).

Cable electrical conductor passing through both internal sealed containment wall and external power containment wall is fixed with a cable input inside the internal sealed wall by means of an embedded connection pipe and is in sliding or rolling joint with cable output towards the external power containment wall. Electrical conductor output connection in the external power wall includes compensation means for relative motion of the electrical conductor and the external wall. Compensation means are made in the form of rollers or their equivalents and shall ensure tight coupling of the conductor with the external wall despite any possible motions of the electrical conductor in the wall or relative motions of both walls or the wall and the conductor relative to each other. Motion of the walls relative to each other or to the conductor may occur during seismic events or due to temperature difference of the external and internal walls or the wall and the conductor, or due to different tension force of cable wires or loosening thereof. Electrical penetration made according to the described invention is designed, first of all, to complete tasks related to prompt and intense motion of the external and internal walls caused by seismic events. In addition, according to the invention design, penetration shall solve problems with slow type of relative motion of the walls and the conductor caused by their thermal expansion. Relative motions either between the walls or between the walls and the conductor may be limited to orthographic motions of the conductor in the pipe with bellows. Horizontal movement is provided by relative motion of the conductor in relation to the external wall. Therefore, tensile load of the conductor or any penetration part is limited due to horizontal movement to the force required to break friction in sliding or rolling sealing providing for compensation means. Movement in a direction orthogonal to the conductor, e.g. vertical movement, is provided by sliding or rolling the conductor in relation to the external wall and slight turning point. Turning point of the conductor output is distributed along the length of the conductor located in the annulus that leads to conductor bending. This design of compensation means is intended only for the conductors capable of bending in the passage area between the external and internal containment walls upon their displacement. If a stiffer conductor of increased diameter that is not capable of bending in the passage area between the external and internal containment walls upon their displacement relative to each other is used, turning point of the conductor output in the compensation means and jamming of the conductor output supports may occur in the pipe and as a result insulating sleeve will be damaged.

The purpose of this invention is to improve operating reliability of the sealed cable input if hard-bending high-voltage electrical conductors are used.

This purpose is achieved by new development for the known sealed cable input through external and internal walls of the nuclear power plant containment containing an embedded connection pipe installed inside the internal wall with internally and rigidly fixed cable input and a pipe installed inside the external wall in line with the connection pipe with bellows on the external end where cable output is located on supports with a gap relating to the pipe internal surface, its novelty is that this cable input is equipped with the second similar bellows symmetrically installed on the opposite pipe end near internal surface of the external wall while loose ends of both bellows are tapered and the cable output is supported by internal surfaces of tapered bellows ends.

In addition, the cable can be located in the space between the external and internal containment walls inside two protective pipes, one of which is cantilever fitted on the internal surface of the internal wall and the other one is cantilever fitted concentrically with the second bellows on the internal surface of the external wall while loose pipe ends are connected with each other using cylinder-shaped bellows.

The gap between the cable surface and the pipe internal surface may not be less than the maximum orthographic thermal and seismic planar motion of the internal wall in relation to the external wall and the change of cable coaxial position in the pipe.

Tapered ends of the bellows can be located in the pipe and directed towards each other.

Twisted conical compression spring may be installed on the bellows crimps.

Cable can be suspended in the pipe on springs.

Provision of the second similar bellows symmetrically installed on the opposite pipe end near the internal surface of the external wall ensures both cable support in the pipe and additional sealing of the cable input.

Loose ends of both bellows are tapered to create supports for the cable output.

The supports designed to fix cable output in the ring surface of tapered bellows ends ensure reliable cable coverage both during horizontal and vertical movements of the cable or the external wall or mutual motion of both the wall and the cable.

Cable laying in protective pipes connected with each other by cylinder-shaped bellows ensures cable protection from temperature drops caused both by short-term current interruptions and accidental water penetration, and provides continuous temperature mode for the cable and therefore protects it from any additional thermal axial displacements.

Cable laying in pipes with the specified gap is calculated on the basis of the maximum displacement of the cable, external and internal walls, the cable and the walls under seismic and thermal impacts on the containment.

Direction of tapered bellows ends towards each other and their location in the pipe improves operating reliability of bellows as they are protected from accidental damages.

Reinforcement of tapered bellows crimps with twisted conical compression springs allows to increase the load on internal support surfaces of tapered bellows ends.

Cable suspension on springs inside the pipe ensures maintenance of the specified gap and redistribution of loads imposed on the internal support surfaces of tapered bellows ends.

The following is the description of one of the numerous options of the sealed cable input through the external and internal nuclear power plant containment walls, each option is subject to the single inventive design indicated in the claims given below.

The invention is illustrated with drawings, where:

Figure 1:
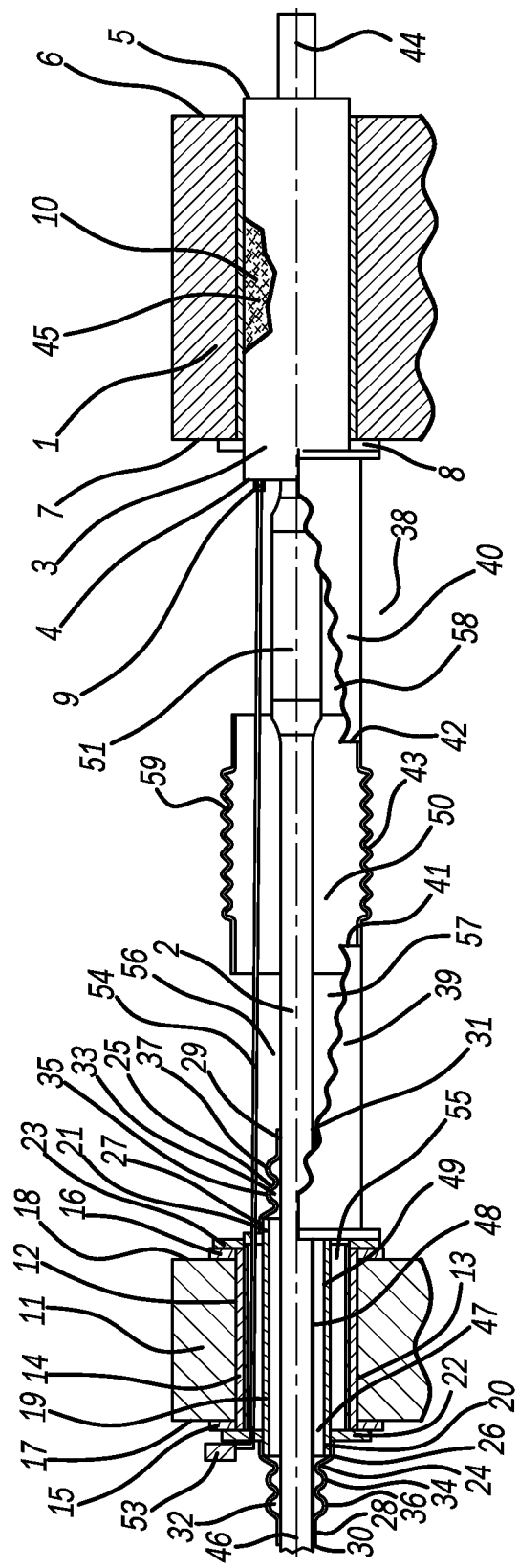
FIG. 1 shows the general view of the sealed cable input installed in the external and internal nuclear power plant containment walls.
Figure 2:
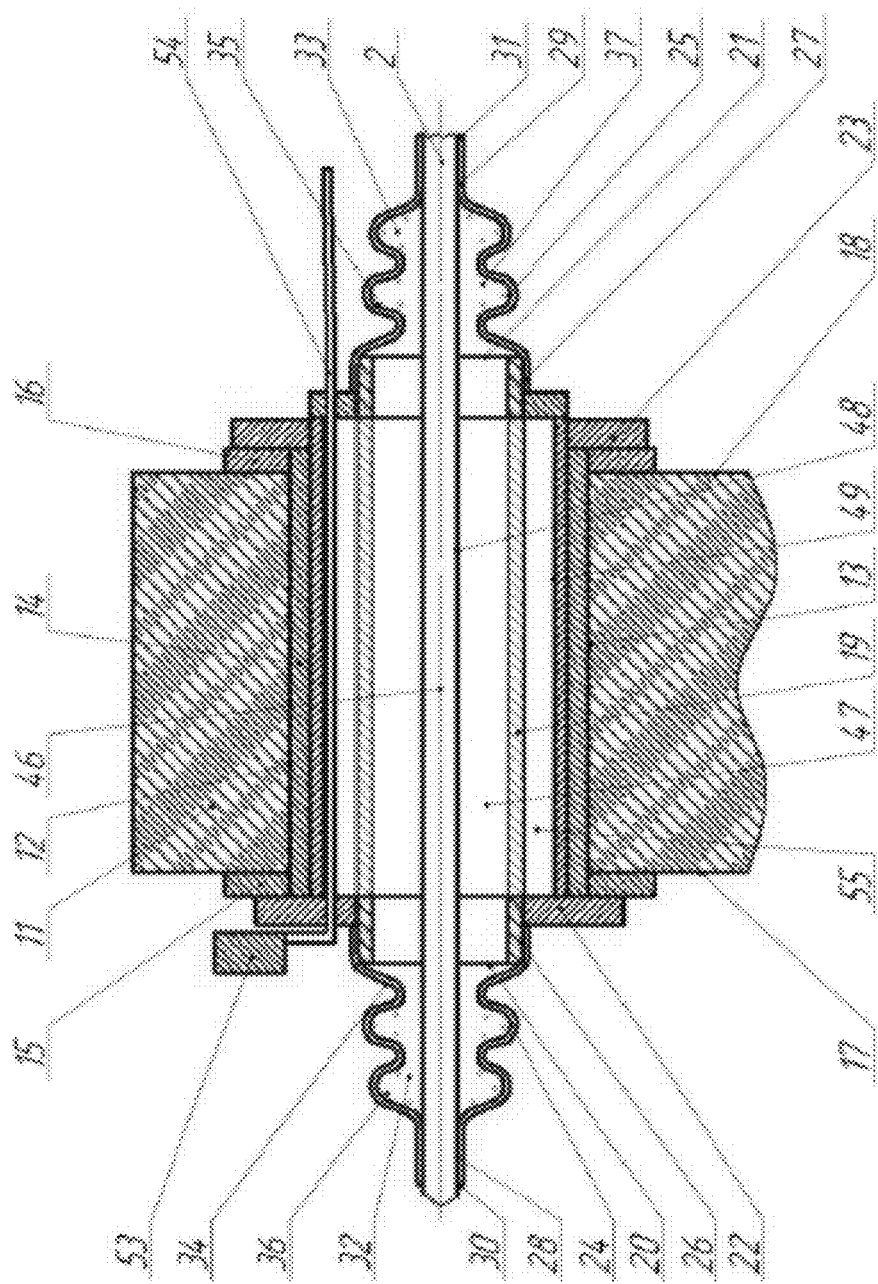
FIG. 2 shows the actuated part of the penetration with compensation means for relative motion of the cable and the external wall.
Figure 3:
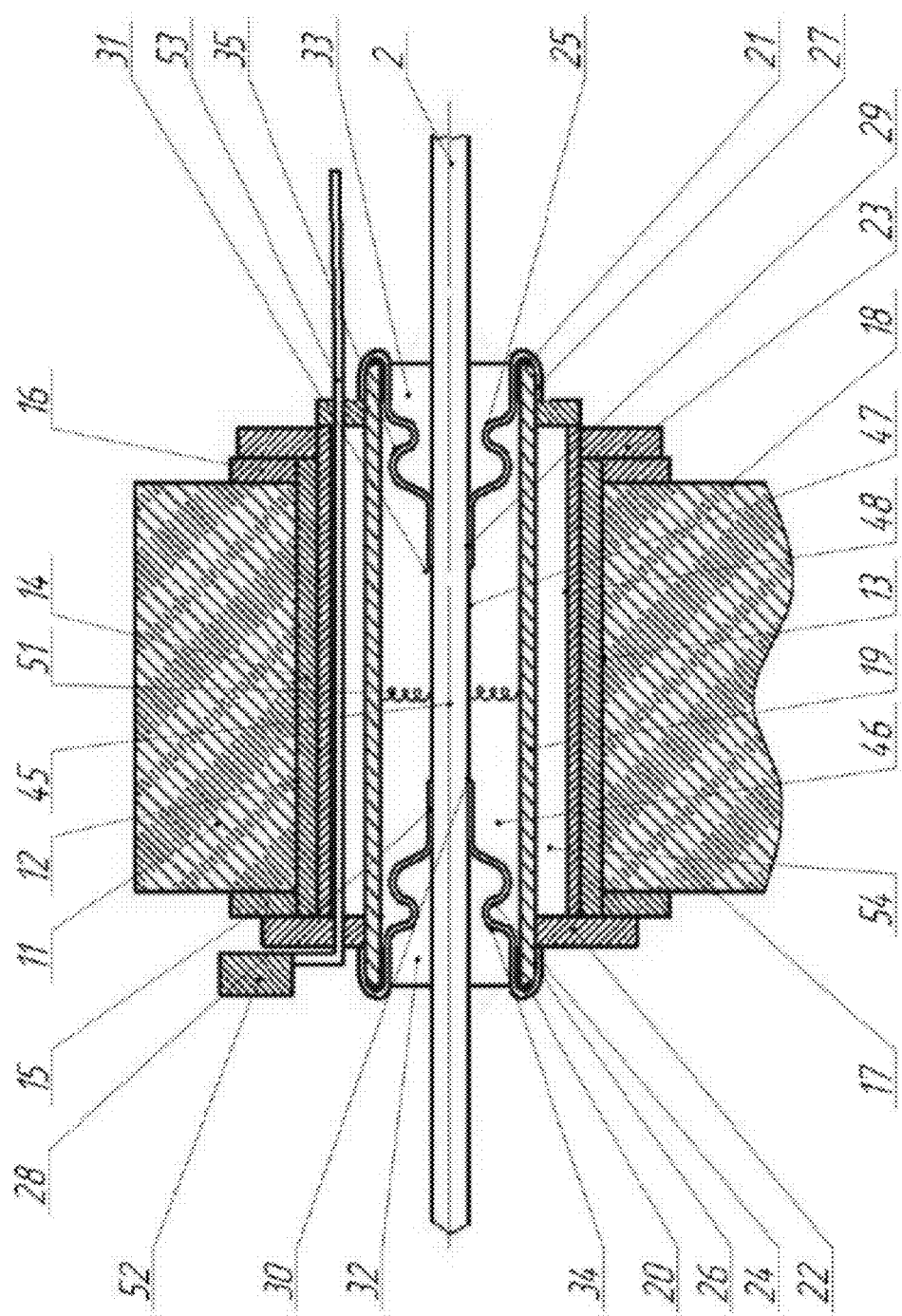
FIG. 3 shows the location of tapered bellows in the pipe and cable detachment on the springs.

The sealed cable input through the external and internal nuclear power plant containment walls contains the first penetration unit consisting of connection pipe 3 fixed with regard to cable 2 and attached to internal reinforced concrete wall 1. Internal wall 1 has a sealed dome-shaped design with average thickness of 1.2 meters and is intended to ensure excess internal pressure containment in case of an accident inside the containment. Ends 4 and 5 of connection pipe 3 overhang beyond the plane of external surface 6 and internal surface 7 of internal wall 1. Counter flange 8 providing for tight and sealed joint of connection pipe 3 in wall 1 is mounted on end 4 of connection pipe 3 on the side of wall 1 internal surface 7. Nozzle 9 connected with cavity 10 of connection pipe 3 is mounted on end 4 of connection pipe 3. Hole 12 is made in line with connection pipe 3 in the opposite external reinforced concrete power dome-shaped wall 11, shell 14 is tightly mounted on walls 13 of this hole where the second penetration unit (moving with regard to cable 2 and including compensation means for relative motion of cable 2 and external wall 11) is mounted. Dome-shaped external wall 11 has average thickness of 0.6 meters and is designed to carry high impact loads from the outside, e.g. aircraft crash. Internal sealed dome-shaped reinforced concrete wall 1 covering the nuclear reactor is enclosed under the power dome of external wall 11. Shell 14 is fixed in wall 11 by external ring 15 and internal ring 16 fastened on external surface 17 of wall 11 and on internal surface 18 of wall 11. Compensation means for relative motion of cable 2 and external wall 11 are located in shell 14. Relative motion compensation means consist of pipe 19 inserted in shell 14 with its ends 20 and 21 fixed in shell 14 by means of external flange 22 and internal flange 23 attached to external ring 15 and internal ring 16 accordingly. Tapered bellows 24 and 25 are mounted on ends 20 and 21 of pipe 19. Both bellows 24 and 25 are made of heat-shrinking non-flammable material with the wider part mounted on ends 20 and 21 of pipe 19. They are mounted by heating with an industrial fan allowing for tight soldering of wider internal surfaces 26 and 27 of bellows 24 and 25 to pipe 19 external end surfaces 20 and 21. Internal support ring-shaped surfaces 28 and 29 of the narrower part of tapered bellows 24 and 25 loose ends 30 and 31 are designed for tight coverage and support of cable 2. For this purpose, twisted conical compression springs 36 and 37 are installed inside cavities 32 and 33 of bellows 24 and 25 for reinforcement on crimps 34 and 35.

Protective covers 39 and 40 are located in annulus 38 between internal wall 1 and external wall 11 of the containment in line with embedded connection pipe 3 and pipe 19: protective pipe 40 is cantilever fitted on internal surface 7 of internal wall 1 by means of counter flange 8, and pipe 39 is cantilever fitted on internal surface 18 of external wall 11 concentrically with the second bellows 25 by means of internal flange 23 while loose ends 41 and 42 of protective pipes 39 and 40 are connected to each other using cylinder-shaped bellows 43. For ease of installation, protective pipes 39 and 40 can be made of compound upper and lower parts, gaps for excess heat removal from heated cable 2 can be provided in the lower part.

Rigid cables 2 for 10 kV can be used in this electric input design. Cable 2 is located in the penetration as follows: cable 2 input 44 is tightly fixed inside embedded connection pipe 3 of internal wall 1, nitrogen gas 45 is pumped in cavity 10, and cable 2 output 46 is installed in pipe 19 of external wall 11 without restraint by means of bellows 24 and 25. Cable 2 output 46 is located in pipe 19 with annular gap 47 formed between braiding 48 over cable 2 external surface and pipe 19 internal surface 49 and calculated on the basis of at least the maximum orthographic thermal and seismic planar motion of internal wall 1 in relation to external wall 11 and the change of cable 2 coaxial position in pipe 19. Setting of this gap 47 is maintained by means of internal support ring-shaped surfaces 28 and 29 formed on narrower ends 30 and 31 of two tapered bellows 24 and 25. Cable 2 output 46 is fixed in support ring-shaped surfaces 28 and 29 of bellows 24 and 25 by heating with an industrial fan allowing to cover and tightly solder internal support ring-shaped surfaces 28 and 29 of bellows 24 and 25 to cable 2 braiding 48. Support ring-shaped surfaces 28 and 29 are used for centering of cable 2 in pipe 19 and designed to prevent cable 2 output 46 from contact of its braiding 48 with pipe 19 internal surface 49 in case of cable 2 output 46 deviation from the axis of cable 2 input 44. As in normal operation when electrical equipment is switched on the temperature of cable 2 cores reaches 95° C., and in case of short circuit currents the temperature of cable 2 cores may increase up to 300° C., temperature drops during current interruptions and cable 2 cooling up to 20° C. can lead to axial deformation of cable 2, namely to the change of its length up to 13 mm at the highest temperature. Therefore, passage length of cable 2 between internal wall 1 and external wall 11 of the containment reaches two meters in annulus 38, cable 2 is located inside two protective pipes 39 and 40 and cylinder-shaped bellows 43 forming air heat accumulating area 50. Internal dimensions of pipe cavities 39 and 40 and bellows 43 are designed with consideration of formation of an air gap around cable 2 ensuring heat removal on one side and smoothing of temperature drops at cable 2 switching on or off on the other side. By means of this thermostat excess axial deformations of cable 2 are reduced and, therefore, additional operation compensation means for relative motion of cable 2 and external wall 11 are excluded, operating reliability of bellows is improved due to fracture control in crimps 34 and 35 of bellows 24 and 25. Protective pipes 39 and 40 and bellows 43 protect cable 2 from undesirable cooling in case of ingress of condensate that can subside when ventilation system is switched off, or water droplets from the emergency supply system located in annulus 38, etc. Stiffness of cable 2 in the passage area in annulus 38 is additionally increased due to the need to install mounting joint 51 in protective pipe 40.

To protect loose narrower ends 30 and 31 of tapered bellows 24 and 25 from damages, as an option, they can be located in pipe 19 and directed towards each other. Depending on cable 2 material, if it is less rigid, cable 2 in pipe 19 is suspended on springs 52 to maintain annular gap 47 between cable 2 braiding 48 and pipe 19 internal surface 49.

To ensure control of electric input sealing, pressure gage 53 connected with nozzle 9 with permeation tube 54 is mounted on external flange 22. Permeation tube 54 is located in space 55 formed between shell 14 and pipe 19 and in space 56 formed between cable 2 and internal walls 57, 58 and 59 of protective pipes 39 and 40 and cylinder-shaped bellows 43 accordingly.

The sealed cable input through external wall 11 and internal wall 1 of the nuclear power plant containment operates as follows. When current is passing through cable 2, power current heats up its metal cores, cable 2 temperature may reach up to 95° C., and due to thermal stress cable 2 starts to lengthen. During normal operation, connection pipe 3 of the first penetration unit fixed in relation to cable 2 is located in line with pipe 19 of the second penetration unit moving in relation to cable 2. This thermal stress caused by lengthening of cable 2 section covering annulus 38 towards external wall 11 is sufficient to overcome pressure load of crimps 35 in bellows 25 and to overcome stretching force of crimps 34 in bellows 24. Compression and stretching of crimps 35 and 34 in bellows 25 and 24 of the compensation means for relative motion of cable 2 and external wall 11 depend on the temperature drops occurred when cable 2 is switched on and off. When cable 2 is switched off, the latter begins to cool, and its length returns to its initial state, in this case crimps 35 of bellows 25 extend and crimps 34 of bellows 24 contract. In addition, cable 2 penetration located in annulus 38 between walls 1 and 11 may be subject to thermal impacts depending on process pipelines to be located in annulus 38, as well as on air humidity, ventilation flow change rate, etc. As cable 2 passage is enclosed in air heat accumulating area 50 formed by protective pipes 39, 40 and bellows 43 and operates as a thermostat, compensation means for relative motion of cable 2 and external wall 11 are operated in a partial load mode and crimps 34 and 35 will be subject to less wear and tear.

However, the following situation may occur. Independent external wall 11 and internal wall 1 of the containment enclosure may start moving. Displacement of walls 1 and 11 or their sections may be independent in relation to each other. For instance in the following cases: when displacements occur due to seismic events, if a polar crane is operated when its supports pass under the first fixed penetration unit, when temperature of walls 1 and 11 or walls 1 and 11 and cable 2 changes, when tension of tensile ropes in internal wall 1 is loosened, etc. Such displacement breaches in-line arrangement of connection pipe 3 and pipe 19. As cable 2 stiffness is sufficient, connection pipe 3 or pipe 19 with internally mounted cable 2 output 46 started to move across the axis of cable 2 output 46 while changing annular gap 47 between its internal surface 49 and cable 2 braiding 48. Crimps 34 and 35 of bellows 24 and 25 start bending thus enabling unconstrained motion of expansion joint pipe 19 in relation to the fixed position of cable 2 output 46 as a response to any motion between walls 1 and 11 or walls 1 and 11 and cable 2 maintaining insulation integrity through the entire thickness of external wall 1. In this case, cylinder-shaped bellows 43 will also be bent, compressed and stretched depending on motion of protective pipes 39 and 40 while maintaining the integrity of cable 2 initial orientation.

Technical and economic benefits lie in the fact that reliability of nuclear power plant operation is improved by maintaining insulation integrity of the cable input throughout the nuclear power plant service life with minimum maintenance.

The invention claimed is:

1. A sealed cable inlet through external and internal containment walls of a nuclear power plant, comprising:
    a connection pipe installed through the internal wall;
    a cable input disposed within a cavity of the connection pipe and rigidly fixed to a portion of the connection pipe;
    a pipe installed through the external wall and coaxially aligned with the connection pipe;
    a first bellows located on a first end portion of the pipe, wherein the first bellows is proximate to an internal surface of the external wall;
    a cable output disposed within the pipe, wherein a first portion of the cable outlet is at least partially received within the first bellows;
    wherein an area defining a gap is formed between an internal surface of the pipe and an external surface of the cable output;
    a second bellows located on a second end portion of the pipe, wherein the first and second end portions are spaced and opposed from one another, wherein the second bellows is proximate to an external surface of the external wall, wherein a second portion of the cable outlet is at least partially received within the second bellows;
    wherein the first and second bellows each includes a free end, wherein the free ends of the first and second bellows are tapered to form narrowed portions thereof;
    wherein the cable output is supported by internal surfaces of the narrowed portions of the tapered free ends of the first and second bellows; and
    wherein the first and second bellows each include corrugated portions formed thereon, wherein a twisted conical compression spring is installed in an area defining an internal cavity of at least one of the corrugated portions of the first and second bellows.

2. The invention according to claim 1, further comprising:
    two protective pipes disposed within a space between the external and internal walls, wherein the two protective pipes are coaxially aligned with one another, wherein the two protective pipes each includes a free end;
    wherein the cable input is at least partially disposed within at least one of the two protective pipes;
    wherein one of the two protective pipes is cantilever fitted on an internal surface of the internal wall and the other one of the two protective pipes is cantilever fitted concentrically with the second bellows on the internal surface of the external wall;

a cylinder-shaped bellows located between the two protective pipes; and wherein the cylinder-shaped bellows interconnects free ends of the two protective pipes.

3. The invention according to claim 1, wherein the gap includes a width that is operable to accommodate a change of cable coaxial position in the pipe due to seismic events or thermal expansion.

4. The invention according to claim 1, wherein the tapered ends of the first and second bellows are located inside the pipe and oriented towards each other.

5. The invention according to claim 1, wherein the cable input is suspended on springs that are disposed within the pipe.

* * * * *